March 3, 1936.  B. M. FROMKNECHT  2,033,067

GRILL

Original Filed April 25, 1932  2 Sheets-Sheet 1

INVENTOR.
Bernard M. Fromknecht
BY
ATTORNEYS.

March 3, 1936.  B. M. FROMKNECHT  2,033,067

GRILL

Original Filed April 25, 1932  2 Sheets-Sheet 2

INVENTOR.
Bernard M. Fromknecht
BY
ATTORNEYS.

Patented Mar. 3, 1936

2,033,067

UNITED STATES PATENT OFFICE 2,033,067

GRILL

Bernard M. Fromknecht, Erie, Pa., assignor to The Griswold Manufacturing Company, Erie, Pa., a corporation of Pennsylvania Application April 25, 1932, Serial No. 607,243
Renewed October 30, 1935

17 Claims. (Cl. 53—5)

The present invention is directed to a type of grill which is provided with opposing cooking plates. In the present invention one of these plates is superimposed over the other plate and the invention has particular relation to the control of the pressure and movement of the upper plate in service. Features and details of the invention will appear from the specification and claims.

A preferred embodiment of the invention is illustrated in the accompanying drawings as follows:—

Figure 1:
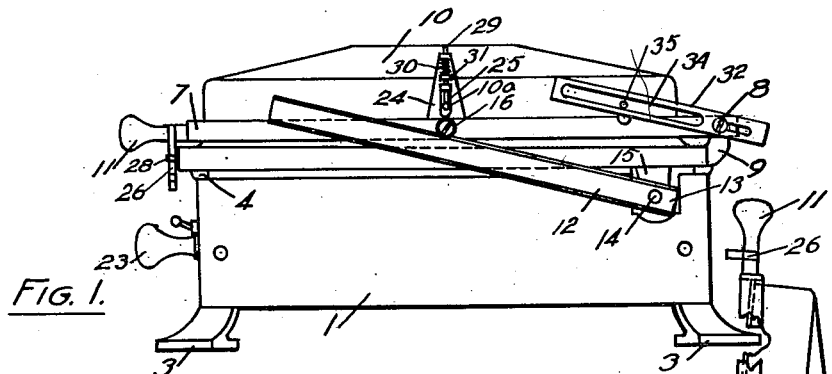
Fig. 1 shows a side elevation of the grill in closed position.
Figure 3:
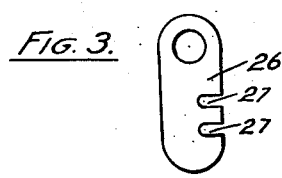
Fig. 3 is a front view of the top plate pressure latch.
Figure 2:
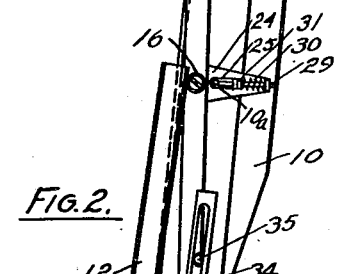
Fig. 2 is a similar view of the grill in open position, part of the side wall of the frame being removed to better show construction.
Figure 4:
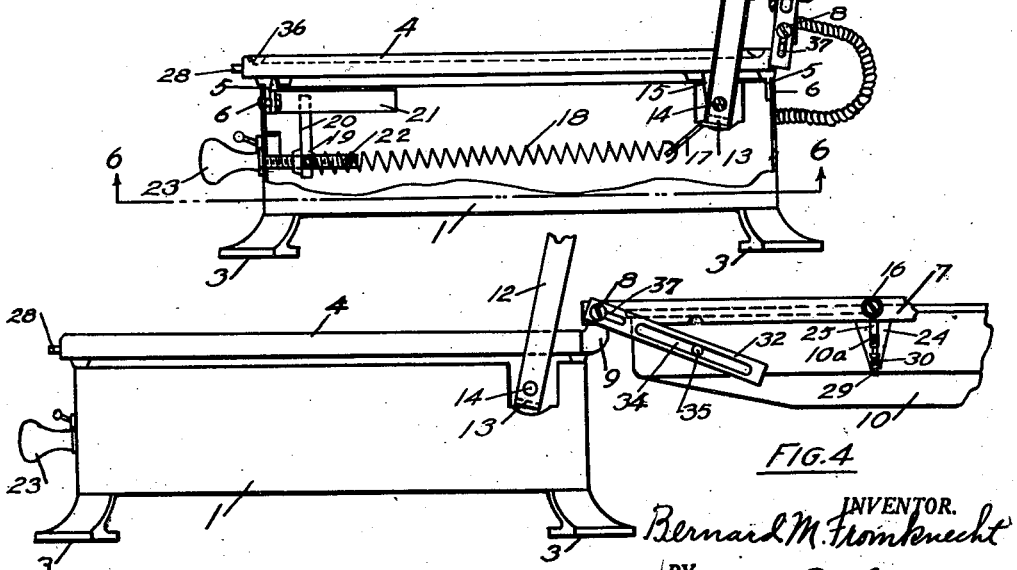
Fig. 4 is a side elevation of the grill showing the top plate swung into reverse position permitting the use of the two plates as independent cooking units.
Figure 5:
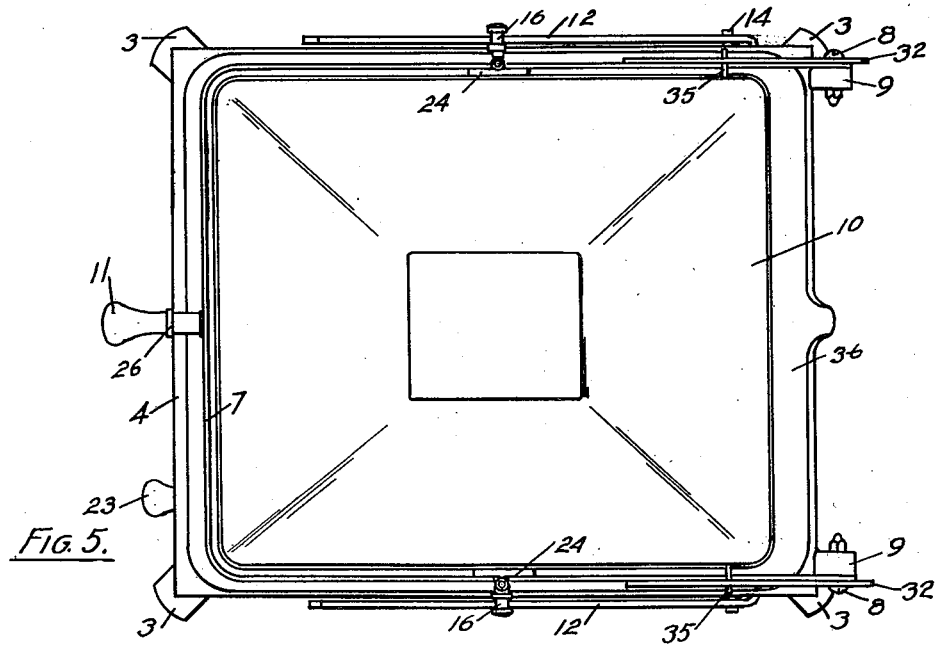
Fig. 5 is a top view of the grill.
Figure 6:
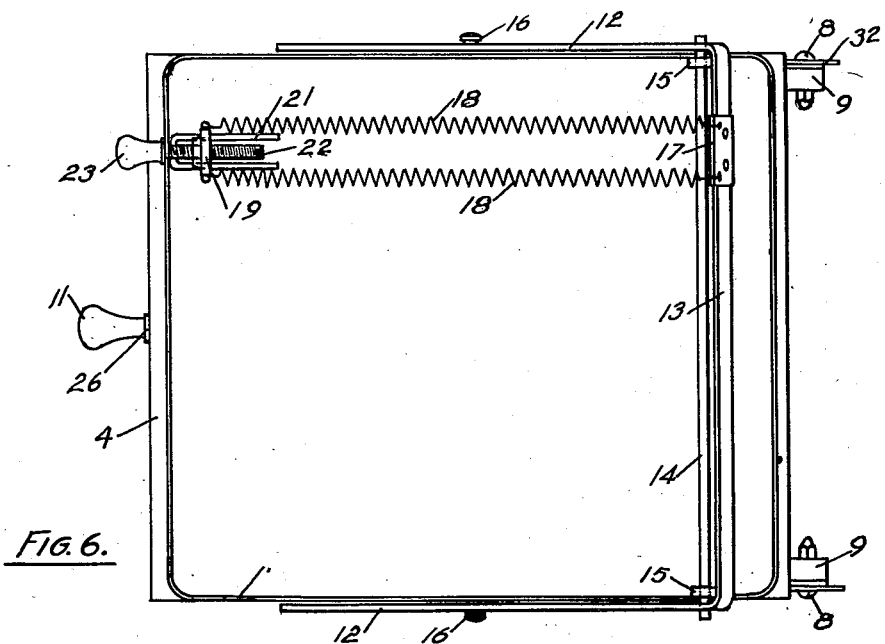
Fig. 6 is a section on the line 6—6 in Fig. 2.

1 marks the frame. This is formed with a surrounding sheet metal wall with feet 3 attached thereto. A bottom plate 4 has downwardly extending flanges 5 which are secured by screws 6 to the side walls 2. The rear ends of a bail 7 of U-form are pivoted on pins 8 arranged on arms 9 extending from the base of the bottom plate. The bail supports the upper plate 10 by means of the pins 10a which extend from the plate 10 forming a pivotal connection with the bail. A handle 11 is arranged on the front of the bail by means of which the top plate may be opened and closed in service.

Levers 12 are formed at the end of a bar 13. This bar with the levers forms a U-shaped structure, the levers extending forwardly with the upper cooking plate in closed position. The levers are pivotally mounted on pins 14 carried by arms 15 extending downwardly from the base of the plate 4. The levers 12 communicate their movement to the top plate by operating on rollers 16 mounted on the sides of the bail. An arm 17 extends downwardly from the cross member 13 and is connected by springs 18 with a nut 19. The nut 19 has an extension 20 which slidingly engages a guide 21 extending from the wall of the frame. A screw 22 operates with the nut 19 and is provided with a handle 23 by means of which the nut may be adjusted and thus the spring adjusted so as to exert a greater, or less, pressure on the lever 12 as may be desired. The levers 12, it will be noted, support a part of the weight of the upper plate, in fact, the spring may be so adjusted as to practically balance the upper plate and this is desirable for certain types of food.

Ears 24 extend upwardly from the bail sides and these ears are provided with slots 25 in which a pin 10a is mounted. In some instances it is desirable to lock out the action of the spring and this is accomplished in the present structure by providing a pressure latch 26. This latch is pivotally mounted on the support of the handle 11. It is provided with a series of locking latch notches 27 which are adapted to engage a pin 28 extending from the base of the plate 4. With the insertion of the food on the plate, the bail 7 may be so depressed as to withdraw the bottom of the slot 25 from the pins 10a and in consequence subjects the interposed food to the entire weight of the upper plate, thus, in effect, locking out the spring 18.

In some instances it may be desirable to increase the pressure over the weight of the upper plate and at the same time afford a yielding pressure so that the upper plate may readily accommodate itself to the material. To this end I provide a sliding pin 29 in the wall of the ear 24 at the outer end of the slot 25. A spring 30 is mounted on this pin and the pin is locked against the action of the spring by a head, or nut 31. When the end of the pin 29 at each side of the top plate engages the pin 10a through the downward movement of the bail 7, the pressure of the spring 30 is exerted against the pin 10a and this pressure may be regulated by the pressure latch 26. If the downward movement of the bail is carried to an extreme the limit of travel of the pin 29 is reached so that a direct pressure of the bail may be exerted on the top plate and the bail locked by the pressure latch at the pressure adjusted. Thus it is possible by adjusting the tension of the spring to carry the upper plate to balance the weight of the upper plate and wholly eliminate pressure by the plate on material being cooked and it is also possible by reducing the tension of the spring to gradually increase the closing pressure of the upper plate to the point where the entire weight of the upper plate is used in compressing the material being cooked. The entire spring action may be removed without adjusting the spring by locking the bail down so as to lock out the spring 18. Added yielding pressure of the upper plate may be accomplished through the pressure on the spring 30 and direct pressure may be accomplished by going beyond the limit of the spring 30 and these different adjustments may be set by the action of the latch 26.

It is desirable to control the action of the upper plate as it is swung to open position, particularly to position the bottom of this plate so any drip from this plate will be deposited in the drip trough 36 of the lower plate. To this end a link 32 is pivotally mounted on the pin 8. The link has a slot 34 in which a pin 35 from the top plate projects. The lower end of the link projects below the pin 8 and engages the rear end of the plate 4 when it is swung to its upper position. Thus it limits the backward movement of the top plate and also definitely positions the bottom of the upper plate so that the drip will be into the trough of the lower plate.

It is sometimes desirable to swing the upper plate completely to the rear so that it, with the front plate, may be used merely as a hot plate, or cooking surface. In order that this may be accomplished, the lower end of the link has a slot 37 by means of which the link may be pushed up so as to clear the plate 4 and permit this movement.

It will be noted that the bail forms a splash guard intercepting grease or material which is thrown off in the cooking operation between the plates. This bail is directly over the trough so that drip from the guard is carried into the trough.

What I claim as new is:—

1. In a grill, the combination of a lower cooking plate; an upper cooking plate; a bail pivotally mounted relatively to the lower cooking plate, said mounting being at the rear of the bail, the sides of the bail extending along the sides of the plates; a pivotal connection between the bail and the upper plate; and a rigid swinging link connecting the rear of the upper plate with the lower plate, said link having lost motion in said connection.

2. In a grill, the combination of a lower cooking plate; an upper cooking plate; a bail pivotally mounted relatively to the lower cooking plate, said mounting being at the rear of the bail, the sides of the bail extending along the sides of the plates; a pivotal connection between the bail and the upper plate; and a rigid swinging link connecting the rear of the upper plate with the lower plate, said link having lost motion in said connection, said link comprising a slot and a pin in the upper plate extending into the slot.

3. In a grill, the combination of a lower cooking plate; an upper cooking plate; a bail pivotally mounted relatively to the lower cooking plate, said mounting being at the rear of the bail, the sides of the bail extending along the sides of the plates; a pivotal connection between the bail and the upper plate; a rigid swinging link connecting the rear of the upper plate with the lower plate, said link having lost motion in said connection; and means limiting the swinging movement of the link for controlling the position of the upper plate when in open position.

4. In a grill, the combination of a lower cooking plate; an upper cooking plate; a bail pivotally mounted relatively to the lower cooking plate, said mounting being at the rear of the bail, the sides of the bail extending along the sides of the plates; a pivotal connection between the bail and the upper plate; a rigid swinging link connecting the rear of the upper plate with the lower plate, said link having lost motion in said connection; and means limiting the swinging movement of the link for controlling the position of the upper plate when in open position, said means comprising devices releasable to permit the backswinging of the upper plate to a position at the rear of the lower plate.

5. In a grill, the combination of a lower cooking plate; an upper cooking plate; a bail pivotally mounted relatively to the lower cooking plate, said mounting being at the rear of the bail, the sides of the bail extending along the sides of the plates; a pivotal connection between the bail and the upper plate; a rigid swinging link connecting the rear of the upper plate with the lower plate, said link having lost motion in said connection; and means limiting the swinging movement of the link comprising an extended portion of the link and a stop engaged by the link.

6. In a grill, the combination of a lower cooking plate; an upper cooking plate; a bail pivotally mounted relatively to the lower cooking plate, said mounting being at the rear of the bail, the sides of the bail extending along the sides of the plates; a pivotal connection between the bail and the upper plate; a swinging link connecting the rear of the upper plate with the lower plate, said link having lost motion in said connection; and means limiting the swinging movement of the link comprising an extended portion of the link and a stop engaged by the link, said extended portion being provided with a slot on which the link is pivoted and permitting a movement of the link to clear the stop and permitting the backward swinging of the plate.

7. In a grill, the combination of a lower cooking plate; an upper cooking plate movable toward the lower plate to exert cooking pressure on material between the plates; a lever pivotally mounted relatively to the lower plate; means communicating movement from the lever to the upper plate comprising a lost motion connection; a spring acting on the lever and through it influencing the closing pressure of the upper plate; and means locking the lever and varying its influence on the closing pressure of the upper plate.

8. In a grill, the combination of a lower cooking plate; an upper cooking plate movable toward the lower plate to exert closing pressure on material between the plates; a lever pivotally mounted relatively to the lower plate; means communicating movement between the lever and the upper plate comprising a slotted connection permitting movement of the plate independently of the lever; a spring acting on the lever and through it influencing the closing pressure of the upper plate; and means locking the lever and varying its influence on the closing pressure of the upper plate.

9. In a grill, the combination of a lower cooking plate; an upper cooking plate movable under the influence of gravity to exert a closing pressure on material between the plates; a lever pivotally mounted relatively to the lower plate; means communicating movement from the lever to the upper plate comprising a lost motion connection; a spring acting on the lever and through it influencing the closing pressure of the upper plate; and means locking the lever and exerting pressure in excess of gravity on the upper plate.

10. In a grill, the combination of a lower cooking plate; an upper cooking plate movable under the influence of gravity to exert a closing pressure on material between the plates; a lever pivotally mounted relatively to the lower plate; means communicating movement from the lever to the upper plate comprising a lost motion connection; a spring acting on the lever and through it influencing the closing pressure of the upper plate; and means locking the lever and exerting a yielding pressure on the upper plate in excess of gravity.

11. In a grill, the combination of a lower cooking plate; an upper cooking plate; a bail having a pivotal mounting relatively to the lower cooking plate, said mounting being at the rear of the bail and the bail extending along the sides of the plate; a pivotal connection between the bail and the sides of the upper plate, said pivotal connection having a lost motion vertically; a lever pivotally mounted relatively to the lower plate and acting on the upper plate through the bail; a spring acting on the lever and through it influencing the closing pressure of the upper plate; and means for locking the bail against the action of the lever to vary the closing pressure of the upper plate.

12. In a grill, the combination of a lower cooking plate; an upper cooking plate; a bail having a pivotal mounting relatively to the lower cooking plate, said mounting being at the rear of the bail and the bail extending along the sides of the plates; a pivotal connection between the bail and the sides of the upper plate comprising a slotted ear and pin; a lever pivotally mounted relatively to the lower plate and acting on the upper plate through the bail; a spring acting on the lever and through it influencing the closing pressure of the upper plate; and means for locking the bail against the action of the lever and for exerting closing pressure on the upper plate.

13. In a grill, the combination of a lower cooking plate; an upper cooking plate; a bail having a pivotal mounting relatively to the lower cooking plate, said mounting being at the rear of the bail and the bail extending along the sides of the plates; a pivotal connection between the bail and the sides of the upper plate comprising a slotted ear and pin; a spring at the end of the slot operating on the pin to afford a yielding pressure means; a lever pivotally mounted relatively to the lower plate and acting on the upper plate through the bail; and means for locking the bail against the action of the lever and for adjusting the bail to exert a yielding closing pressure through the springing in the slot.

14. In a grill, the combination of a lower cooking plate; an upper cooking plate and movable toward the lower plate to exert closing pressure on inserted material; a swinging connection between said plates; a spring influencing the closing pressure of the upper plate; and means comprising a catch device locking out the spring and permitting the upper plate to act free from its action.

15. In a grill, the combination of a lower cooking plate; an upper cooking plate movable through the influence of gravity toward the lower plate exerting closing pressure on an inserted material; a swinging connection between said plates; a spring influencing the closing pressure of the upper plate; and means locking out the spring and permitting the upper plate to act independently of the influence of the spring and a closing pressure on the upper plate in excess of gravity.

16. In a grill, the combination of a lower cooking plate; an upper cooking plate; a swinging connection between said plates; a bail pivotally mounted with relation to the lower plate, said mounting being at the rear of the bail and said bail extending along the sides of said plates; a pivotal connection between the bail and the upper plate; and means for locking the bail in a lowered position to exert a closing pressure on the upper plate.

17. In a grill, the combination of a lower cooking plate; an upper cooking plate, the upper cooking plate being adapted to be superimposed over the lower cooking plate with food to be cooked interposed between the plates forming a space opening at the edges of the plates; and a splash guard opposite the opening along the front and sides of the plates in position to receive material discharged from between the plates during a cooking operation, said guard being in the form of a bail through which the upper plate may be operated.

BERNARD M. FROMKNECHT.